Patented Sept. 24, 1940

2,216,094

UNITED STATES PATENT OFFICE 2,216,094

PREPARATION OF STYRENE COPOLYMERS IN FINELY DIVIDED FORM

Edgar C. Britton, Midland, Mich., Harry Borden Marshall, Toronto, Ontario, Canada, and Walter J. Le Fevre, Midland, Mich., assignors to The Dow Chemical Company, Midland, Mich., a corporation of Michigan No Drawing. Application August 1, 1938, Serial No. 222,442

9 Claims. (Cl. 260—78)

This invention concerns an improved method for the preparation of insoluble styrene copolymers in finely divided form.

In the co-pending applications of Britton et al., Serial No. 191,958, filed February 23, 1938 now U. S. Patent No. 2,186,359; Serial No. 191,959, filed February 23, 1938; Serial No. 191,960, filed February 23, 1938 now U. S. Patent No. 2,186,360; Serial No. 199,892, filed April 4, 1938; and Serial No. 213,022, filed June 10, 1938, are described a number of polymeric products derived from styrene and prepared by copolymerizing styrene with certain unsaturated esters and ethers, e. g., tri-allyl phosphate, the di-furoate of 1.4-dioxanediol-2.3, allyl crotonate, allyl methacrylate, diallyl oxalate, diallyl adipate, the di-cinnamate of 1.4-dioxane-diol-2.3, tri-methallyl phosphate, cinnamyl cinnamate, the diallyl ether of 1.4-dioxanediol-2.3, 2-chloroallyl crotonate, di-(2-chloroallyl) adipate, etc. These copolymers are substantially insoluble in common organic solvents but are capable of swelling to form insoluble gels when placed in contact with organic liquids which are solvents for polystyrene itself, e. g., carbon tetrachloride, dioxane, methylene chloride, aromatic hydrocarbon solvents such as benzene and toluene, etc. They possess a number of properties which make them valuable for the manufacture of molded or shaped objects, e. g., transparency, stability against discoloration, high dielectric strength, good mechanical strength, resistance to attack by acids and alkalies, etc. Such molded or shaped objects are usually prepared by compression or injection molding and in either case it is necessary that the copolymer be employed in finely divided form.

However, ordinary mechanical methods of disintegration, as for example, grinding in a roller or hammer mill, are not suited to the preparation of the copolymers in finely divided form, since the vigorous grinding treatment required to reduce the tough, resinous polymeric mass to a fine powder causes degradation of the copolymer accompanied by reduction in molecular weight. Moreover, the heat generated during such mechanical treatment is often sufficient to soften the thermoplastic copolymer with consequent clogging and gumming of the grinding mechanism. Also, such mechanical grinding operations necessitate the use of expensive equipment and require considerable expenditure of power.

We have found that styrene copolymers of the insoluble swelling type may be prepared, without degradation, in finely divided form by causing the copolymer to swell to a gel through contact with a swelling solvent, e. g. benzene, toluene, dioxane, etc., breaking the gel into small particles, and thereafter precipitating the copolymer by contacting the finely divided gel with a liquid which is not capable of swelling or dissolving the copolymer, e. g., ethanol, methanol, petroleum ether, etc. The precipitated co-polymer is then filtered from the solvents, dried, and obtained as a fine white powder suitable to be employed as a molding powder. The powdered product is usually more pure than before the treatment, since monomeric styrene which may initially be present in the co-polymer is extracted by the swelling solvent.

In a preferred mode of practicing the invention, the resinous mass obtained by copolymerizing styrene and an ester or ether copolymerizing agent is first crushed or cut into pieces of suitable size for handling, e. g., of 1/8 to 1 inch linear dimensions. The comminuted material is placed in approximately 8–12 volumes of benzene or other swelling solvent, for example, toluene, ethylbenzene, carbon tetrachloride, etc., and allowed to stand until swollen to a relatively firm gel. Usually the copolymers are completely swollen after standing in contact with the solvent for 4–10 hours, although the exact time required depends somewhat upon the solvent employed and upon the particular copolymer under treatment. The gel is reduced to small particles by forcing through a 40–80 mesh screen or by rapid stirring with a suitable beater and the copolymer is precipitated from the finely divided gel by contacting the latter with approximately 5–10 volumes of ethanol or other liquid precipitant, e. g., methanol or other lower aliphatic alcohol, petroleum ether, water, etc. The precipitated co-polymer is then filtered or centrifuged from the solvents and dried, preferably under vacuum. Substantially all of the copolymer originally employed is obtained as a fine white powder suitable for use in molding operations. The solvents may be separated from one another and re-employed in subsequent operations.

In some cases, it is desirable to suspend the finely divided gel in an inert liquid medium before precipitation in order to facilitate handling and to insure intimate contact between the gel and the precipitating liquid. In general, we prefer to suspend the gel in 1-2 volumes of acetone before contacting with the precipitant, although any other liquid which is miscible with the swelling and precipitating liquids and which does not cause further swelling of the gel may be employed. Such liquid should not, of course, be employed in an amount sufficient to cause precipitation of the copolymer.

The following example illustrates one way in which the principle of the invention has been applied, but is not to be construed as limiting the same:

*Example*

A mixture of 3.0 pounds of monomeric styrene and 0.3 pound of diallyl oxalate was polymerized by heating at 90° C. for 8 days. The polymeric product was a transparent resinous mass which was insoluble in ethanol but capable of being swelled to a firm gel in benzene and other aromatic hydrocarbon solvents. This product was cut into pieces of approximately ¼ inch maximum linear dimension after which the material was placed in 3 gallons of benzene and was allowed to stand for 5 hours. At the end of this time the copolymer was swollen to a firm transparent gel. The gel was comminuted by forcing through a 60-mesh screen, and the finely divided gel was suspended in 3.5 gallons of acetone. The gel suspension was then poured with rapid stirring into approximately 20 gallons of alcohol whereby the copolymer was precipitated as a fine white powder which was filtered from the mixture of benzene, acetone, and alcohol, and was dried in a vacuum oven at approximately 80° C.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:

1. The method of comminuting a styrene copolymer which is substantially insoluble but capable of being swelled in organic solvents which comprises causing the copolymer to swell to a gel by contact with a swelling solvent, comminuting the gel, and thereafter precipitating the copolymer as a fine powder by contacting the finely divided gel with a liquid precipitant.

2. The method of comminuting a styrene copolymer which is substantially insoluble but capable of being swelled in organic solvents which comprises causing the copolymer to swell to a gel by contact with benzene, comminuting the gel, and thereafter precipitating the copolymer as a fine powder by contacting the finely divided gel with ethanol.

3. The method of comminuting a styrene copolymer which is substantially insoluble but capable of being swelled in organic solvents which comprises causing the copolymer to swell to a gel by contacting with from about 8 to about 12 volumes of benzene, comminuting the gel, and thereafter precipitating the copolymer as a fine powder by contacting the finely divided gel with from about 5 to about 10 volumes of ethanol.

4. The method of comminuting a styrene copolymer which is substantially insoluble but capable of being swelled in organic solvents which comprises causing the copolymer to swell to a gel by contact with a swelling solvent, comminuting the gel, suspending the finely divided gel in an amount of a non-swelling liquid insufficient to cause precipitation of the copolymer, and thereafter precipitating the copolymer as a fine powder by contacting the gel suspension with a liquid precipitant.

5. The method of comminuting a styrene copolymer which is substantially insoluble but capable of being swelled in organic solvents which comprises causing the copolymer to swell to a gel by contact with a swelling solvent, comminuting the gel, suspending the finely divided gel in an amount of acetone insufficient to cause precipitation of the copolymer, and thereafter precipitating the copolymer as a fine white powder by contacting the gel suspension with a liquid precipitant.

6. The method of comminuting a styrene copolymer which is substantially insoluble but capable of being swelled in organic solvents which comprises causing the copolymer to swell to a gel by contact with a swelling solvent, comminuting the gel, suspending the finely divided gel in an amount of acetone insufficient to cause precipitation of the copolymer, and thereafter precipitating the copolymer as a fine white powder by contacting the gel suspension with a lower aliphatic alcohol.

7. The method of comminuting a styrene copolymer which is substantially insoluble but capable of being swelled in organic solvents which comprises causing the copolymer to swell to a gel by contact with benzene, comminuting the gel, suspending the finely divided gel in an amount of acetone insufficient to cause precipitation of the copolymer, and thereafter precipitating the copolymer as a fine white powder by contacting the gel suspension with ethanol.

8. The method of comminuting a styrene copolymer which is substantially insoluble but capable of being swelled in organic solvents which comprises causing the copolymer to swell to a gel by contacting with from about 8 to about 12 volumes of benzene, comminuting the gel, suspending the finely divided gel in from about 1 to about 2 volumes of acetone, and thereafter precipitating the copolymer as a fine powder by contacting the gel suspension with from about 5 to about 10 volumes of ethanol.

9. The method of comminuting a styrene copolymer which is substantially insoluble but capable of being swelled in organic solvents which comprises causing the copolymer to swell to a gel by contacting with from about 8 to about 12 volumes of benzene, comminuting the gel by forcing through a 40–80 mesh screen, suspending the finely divided gel in from about 1 to about 2 volumes of acetone, and thereafter precipitating the copolymer as a fine powder by contacting the gel suspension with from about 5 to about 10 volumes of ethanol.

EDGAR C. BRITTON.
WALTER J. LE FEVRE.
HARRY BORDEN MARSHALL.